(12) United States Patent
Sye et al.

(10) Patent No.: US 6,810,760 B2
(45) Date of Patent: Nov. 2, 2004

(54) GEAR TRAIN MATING INTERFACE FOR SEPARABLE MAILING MACHINE MODULES

(75) Inventors: Chiping Sye, Stamford, CT (US); David Privin, Stamford, CT (US); Steven A. Supron, Middlebury, CT (US)

(73) Assignee: Pitney Bowes Inc., Stamford, CT (US)

( * ) Notice: Subject to any disclaimer, the term of this patent is extended or adjusted under 35 U.S.C. 154(b) by 119 days.

(21) Appl. No.: 10/255,476

(22) Filed: Sep. 25, 2002

(65) Prior Publication Data

US 2004/0055406 A1 Mar. 25, 2004

(51) Int. Cl.[7] .......... F16H 35/06; F16H 35/08; F16H 51/02
(52) U.S. Cl. .............. 74/405; 74/395; 74/397; 74/606 R
(58) Field of Search .............. 74/405, 380, 384, 74/395, 396, 397, 412, 413, 606 R

(56) References Cited

U.S. PATENT DOCUMENTS

| | | | |
|---|---|---|---|
| 4,041,422 A | * 8/1977 | Noji et al. | 334/49 |
| 4,616,527 A | * 10/1986 | Frey et al. | 74/625 |
| 4,653,340 A | 3/1987 | LaBate | |
| 5,016,493 A | * 5/1991 | Han | 74/840 |
| 5,746,091 A | * 5/1998 | Schaede | 74/409 |
| 5,967,038 A | * 10/1999 | Feller | 101/247 |
| 6,289,758 B1 | * 9/2001 | Kugio et al. | 74/354 |
| 6,655,273 B2 | * 12/2003 | Bitterich et al. | 101/216 |

* cited by examiner

Primary Examiner—David A. Bucci
Assistant Examiner—Colby Hansen
(74) Attorney, Agent, or Firm—Brian A. Lemm; Angelo N. Chaclas

(57) ABSTRACT

Methods and apparatus are provided for mating a first gear and a second gear, such as those utilized in drive mechanisms of mailing machine modules. A gear frame can mount a first gear on a first annular gear mount. A first end of a link can be pivotally mounted on a fulcrum and a second end can have a second gear mounted on a second annular gear mount. A normal force can be provided on the link in a direction opposing pivotal movement of the link. When the first gear and the second gear are brought together for mating, the link can pivot to allow the first gear and the second gear to mesh. The second annular gear mount can be guided into a channel in the gear frame to secure the second gear in a meshed position with the first gear.

16 Claims, 4 Drawing Sheets

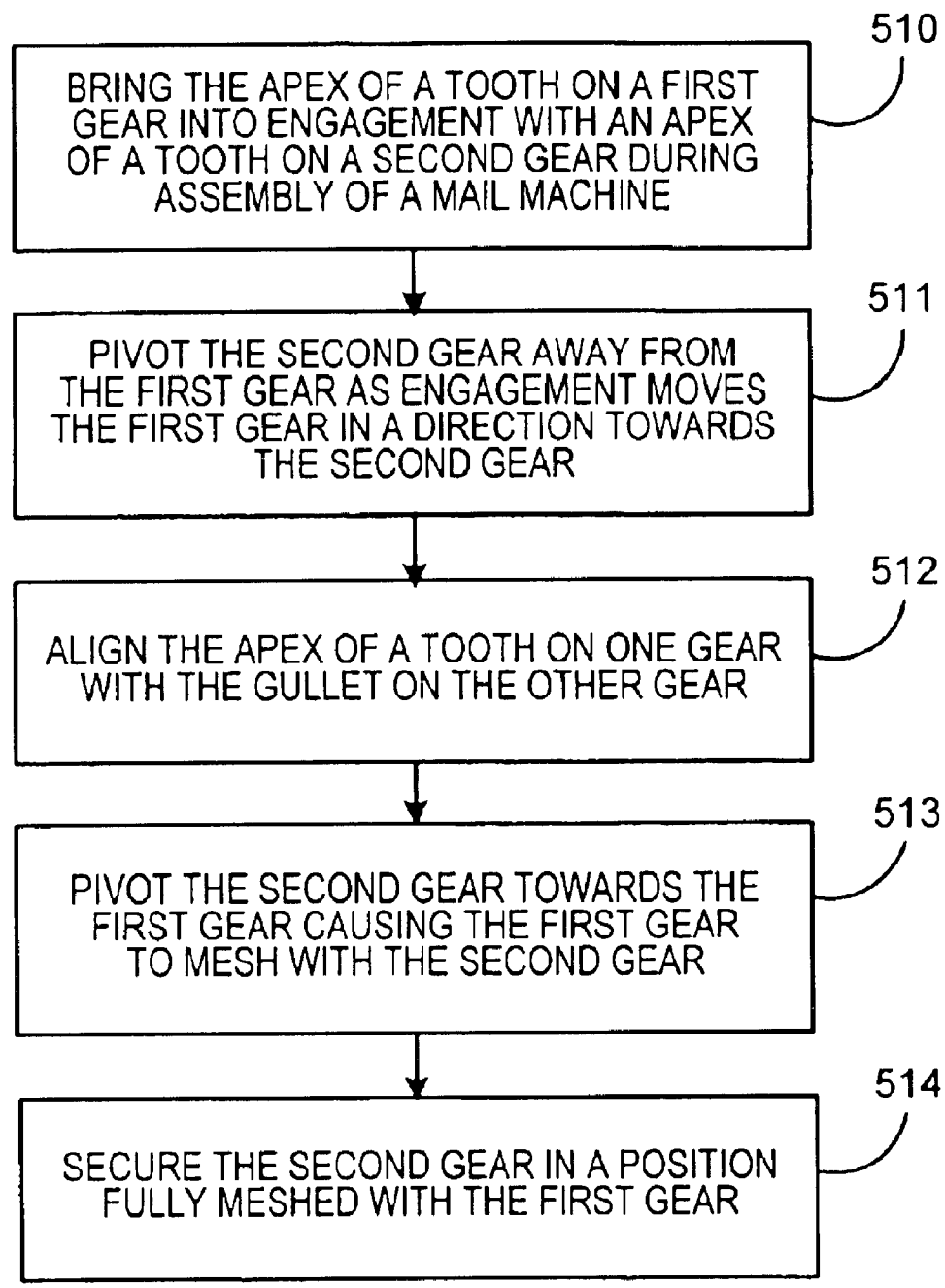

GEAR TRAIN MATING INTERFACE FOR SEPARABLE MAILING MACHINE MODULES

BACKGROUND

This invention relates generally to the field of alignment of machine modules, and more particularly to guiding and aligning gears into a mating position as modules are aligned on a mailing machine.

Generally, a mailing machine transports envelopes and other mailpieces along a deck so that various functions may be performed on the mailpiece at different locations along the deck. For example, one location along a deck may weigh the mailpiece, another location may seal the mailpiece and still another location may apply indicia for postage to the mailpiece. Typically, drive rollers and/or belts are mounted along the deck with a radial portion contacting each envelope to propel the envelope along the deck. The drive rollers or belt can extend, for example, through aligned cutouts in the deck. The drive rollers and/or belt move the mailpiece along the deck to different locations on the deck where a function may be performed.

Generally, it is known for a mailing machine to be assembled from two or more modules. When assembled the modules can form the transport deck and also include apparatus to perform various functions on a mail piece as the mail piece traverses the transport deck. For example, one module may be primarily concerned with receiving and feeding envelopes into additional modules making up the mailing machine. Another module may have a primary purpose of performing a sealing function by moistening an adhesive which is present on the inner surface of an envelope flap before the envelope is fed into a nip which serves to seal the envelope with the moistened adhesive. Still another module may weigh the envelope or print indicia on the envelope.

Assembly of two or more modules can be accomplished at a customer site and can involve joining of irregular shapes which are included in a transport deck, as well as joining drive mechanisms utilized to transport the envelope along the transport deck. Joining a drive mechanism can include mating two or more gears from disparate modules.

When two or more gears mate with each other, the tip of a gear tooth on a first gear has been known to jam against the tip of a gear tooth of a second gear instead of entering a gullet on the second gear and thereby meshing with the second gear. Jamming gears can frustrate a user and generally make the assembly of modules more difficult.

Therefore, it would be advantageous to provide apparatus and methods that overcame the drawbacks of the prior art. In particular, it would be desirable to provide an apparatus and methods to facilitate meshing of gears and thereby ease the assembly of modules on a mailing machine.

SUMMARY

Accordingly, the present invention provides methods and apparatus for mating a first gear and a second gear, such as those utilized in drive mechanisms of mailing machine modules. A gear frame can include a first annular gear mount with a first gear mounted on the gear mount and a channel formed by a first edge and a second edge. A link having two ends, with a first end pivotally mounted on a fulcrum and a second annular gear mount included on the second end can have a second gear mounted on the second annular gear mount. A means for providing a normal force on the link in a direction opposing pivotal movement of the link can also be provided.

When the first gear and the second gear are brought together for mating, the link pivots to allow the first gear and the second gear to mesh, and the second annular gear mount is guided into the channel in the gear frame to secure the second gear in a meshed position with the first gear.

A normal force on the link, in a direction opposing pivotal movement of the link, can be provided, for example, by a spring attached to a spring hook. The spring hook can be fixedly attached to the link such that the spring will exert a normal force on the spring hook in response to pivotal movement of the link.

In some embodiments, a third gear can be mounted on a third annular gear mount that is concentric with the fulcrum. The third gear can mesh with the second gear throughout mating of the first gear and the second gear.

Embodiments can also include a mailing machine with a first module having a gear frame including a first annular gear mount with a first gear mounted thereon and a channel formed by a first edge and a second opposing edge. A second module can be included for mating with the first module. The second module can have a link pivotally mounted at a first end on a fulcrum. The link can also have a second end including a second gear mounted on the second end. The second gear can mate with the first gear of the first module when the first and second modules are mated. The second module can further include a means for providing a normal force on the link in a direction opposing pivotal movement of the link. When the first module and the second module are brought together, the link can pivot to allow the first gear and the second gear to mesh. The second annular gear mount can be guided into the channel in the gear frame to secure the second gear in a meshed position with the first gear.

In another aspect, a method for mating gears into a meshed position during assembly of a mailing machine can include moving a first gear towards a second gear and engaging an apex of a tooth on a first gear with an apex of a tooth on a second gear. The second gear can pivot away from the first gear as the second gear continues moving the first gear towards the second gear. The continued movement can cause the apex of a tooth on the first gear to be aligned with a gullet on the second gear. Pivoting the second gear towards the first gear causes the first gear and the second gear to mesh. The second gear can also be secured in a position fully meshed with the first gear.

Therefore it should now be apparent that the invention substantially achieves all the above aspects and advantages. Additional aspects and advantages of the invention will set forth in the description that follows, and in part will be obvious from the description, or may be learned by practice of the invention. Various features and embodiments are further described in the following figures, descriptions and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 6 illustrates a flow of steps that can be completed while practicing the present invention.

DETAILED DESCRIPTION

The present invention includes apparatus and methods for meshing gears on a machine, such as, for example, a mailing machine. During assembly of various modules or other portions of a mailing machine; it is sometimes necessary to merge gears associated with different portions of the mailing machine. Embodiments of the present invention facilitate alignment of gears which need to mesh, such as those included in different modules being assembled into a mailing machine. Proper alignment can address jamming gears and remove an obstacle to assembly of a mailing machine from multiple modules. While the present invention will be described with respect to a mailing machine, it should be understood that the present invention is not so limited and can be used with any type of machine.

For the purpose of this application, two or more gears are "jammed" when the apex, or tip of a tooth, of one gear comes into contact with the apex of a tooth of another gear. A jam is generally opposed to "meshing" of two or more gears, where meshing occurs when the apex of a tooth on one gear is inserted into the gullet of another gear. Generally, depending upon the type of gears involved, meshed gears allow rotational or linear movement of one gear to be transferred to rotational or linear movement of the other gear with which it is meshed.

Figure 1:
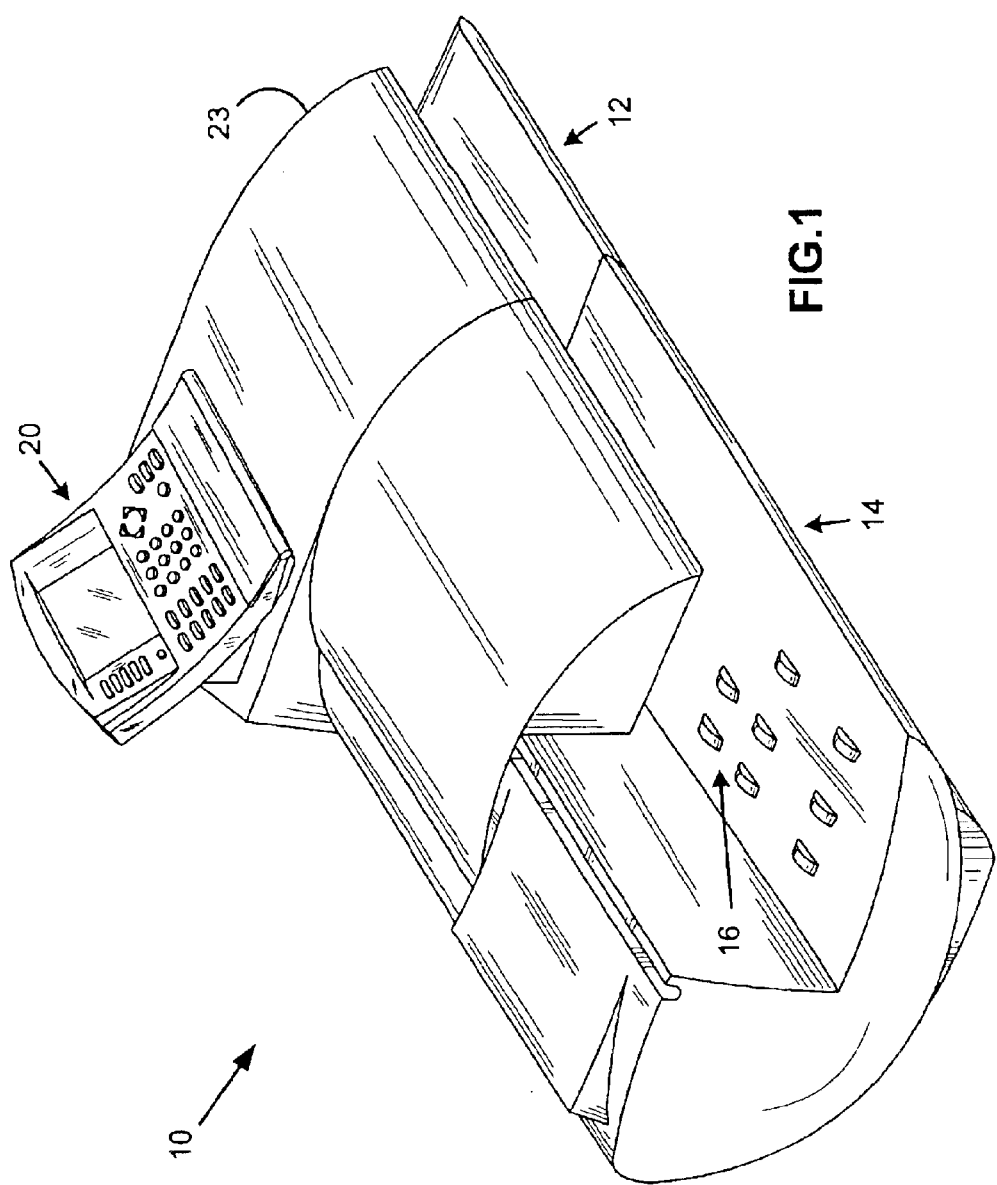
FIG. 1 illustrates a perspective view of a modular mailing machine of the type in which the present invention may be utilized.

Referring now to FIG. 1, there is seen a mailing machine generally designated by the reference numeral 10. The mailing machine 10 includes two modules, a first module 12, such as, for example, a metering module, which may or may not have a weighing functionality, and a second module 14, such as, for example, a feeder-sealer module. The details of construction of these modules in relation to the operation thereof form no part of the present invention, and therefore are not described in full detail. It is sufficient for an understanding of the invention to note generally that the feeder-sealer module 14 includes a feeding area 16 into which a stack of envelopes is placed, and a suitable feeding mechanism separates the envelopes seriatim and feeds them through the feeder-sealer module 14 in which the envelope flaps are opened, the flaps are moistened and the envelope flaps are then closed and sealed. The envelopes then travel from this module to the metering module 12 in which they optionally can be weighed, the amount of postage for each envelope is calculated by a postage meter generally designated by the numeral 20, and an appropriate postage indicia showing the postage is printed on the envelopes. The feed path along which the envelopes travel commences at the feeding area 16 on the feeder-sealer module 14, extends through both modules 12 and 14, and terminates at the discharge end 23 shown at the right side of the module 12 as viewed in FIG. 1. It will be apparent, of course, that both modules 12 and 14 are covered with suitable top, front, rear and side housing panels so as to enclose and protect the operating components of the modules.

When the modules 12 and 14 are mated together, it is necessary to mesh gears associated with each module together to provide a constant feeding mechanism for transporting the envelopes through the mailing machine 10. According to the present invention, alignment of the gears required to be meshed is facilitated and jamming of the gears can be prevented.

Figure 2:
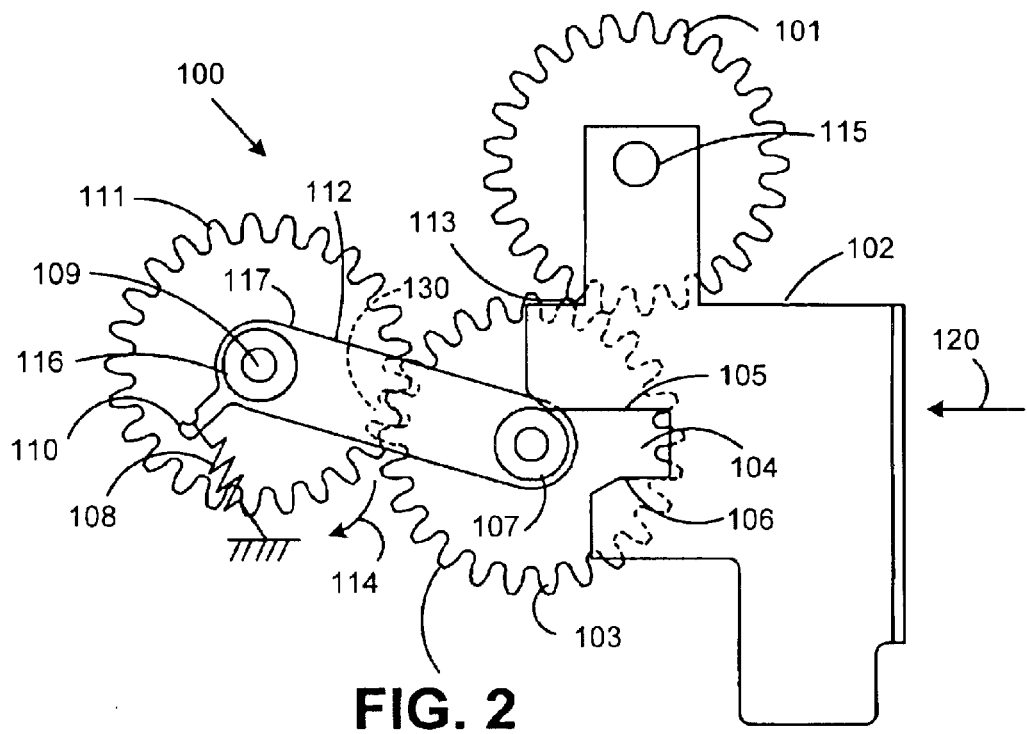
FIG. 2 illustrates a gear mating interface according to the present invention.

Referring now to FIG. 2, an assembly 100 containing inventive features of a gear train mating interface according to some embodiments of the present invention is illustrated. A gear frame 102 can include a first gear 101 which will mesh with a second gear 103 when assembly has successfully been accomplished. For example, the first gear 101 can be associated with one module of a mailing machine 10, such as, for example, module 12, and the second gear 103 can be associated with another module of the mailing machine 10, and the second gear, such as, for example, module 14. The first gear 101 and the second gear 103 can be brought into alignment and made to mesh with each other. Meshing can occur as a result of movement of the gear frame 102 in the direction of the arrow 120, and/or movement of the link 112 conducive to assembly, such as when various modules of a mailing machine are assembled together.

The gear frame 102 can include a first annular gear mount 115 for mounting the first gear 101. The first annular gear mount 115 can include any known features associated with the mounting of gears on an assembly, such as a concentric bearing or bushing to facilitate rotation of the first gear 101 according to a particular application or function associated with the first gear 101.

The gear frame 102 can also have a channel 104 formed by a first edge 105 and a second edge 106. The channel 104 can be proximate to the first gear 101 such that it is useful to facilitate alignment of the second gear 103 with the first gear 101. The first edge 105 and a second edge 106 can be generally parallel to each other at a distance approximately equal to or slightly greater than the diameter of a second annular gear mount 107. The first edge 105 can be located closest to the first annular gear mount 115 at a distance which would allow a second gear 103, mounted on the second annular gear mount 107, to be fully meshed with a first gear 101 mounted on the first annular gear mount 115, while the circumference of the second annular gear mount 107 is in contact with the first edge 105 of the channel 104. The circumference of the second annular gear mount 107 can be made to contact the first edge 105, for example, during assembly of disparate modules of a mailing machine.

The first edge 105 can also extend beyond the second edge 106 in a general direction from which a second gear 103 will approach during assembly, wherein assembly includes meshing of the first gear 101 and the second gear 103.

The second annular gear mount 107 can be contained on a supportive portion 117 of a link 112. The link 112 can be pivotally mounted on a fulcrum 109 with the supportive portion 117 of the link 112 extending away from the fulcrum 109 and the second annular gear mount 107 located at a distal end of the link 112 in relation to the fulcrum 109.

As the link 112 and the gear frame 102 are brought together, such as during assembly of modules of a mailing machine, second annular gear mount 107 can be brought into alignment with the channel 104. If a contact point 113 occurs at the apex of a tooth of the first gear 101 and the apex of a tooth of the second gear 103, instead of the resultant jam preventing further movement towards assembly, in the direction of arrow 120, the link 112 can be made to pivot around the fulcrum 109 in a direction of arrow 114 away from the jam. Pivoting away from the jam can allow the assembly motion to continue instead of causing the first gear 101 and the second gear 103 to bind. The force for the pivot of the link 112 can originate with a force associated with assembly, such as, for example, from a person causing the modules to come together.

A spring 108 or other device can cause a force to be exerted on the link 112 in a direction opposite to the pivotal direction 114 of movement of the link 112. The force exerted on the link 112 in the direction opposite of the pivotal direction 114 can keep the second gear 103 in contact with the first gear 101, so that further movement in the direction of assembly will eventually align the apex of a gear tooth of one gear 101, 103 with a gullet of the other gear 101, 103 and cause the first gear 101 and the second gear 103 to mesh. For example, as illustrated, the spring 108 can be attached to a spring hook 110 formed into the link 112, or otherwise rigidly attached to the link, at the end of the link 112 proximal to the fulcrum 109. The spring hook 110 can extend away from the supporting portion 117 of the link 112. As the link 112 pivots, the spring 108 can exert a normal force upon the spring hook 110 which can translate into a pivotal force for the link around the fulcrum 109 in a direction which will keep the first gear 101 and the second gear 103 in contact.

Numerous other embodiments can also be utilized to provide a force in a direction opposite to the pivotal direction 114 of movement of the link 112, such as, for example, a torsional spring around the fulcrum, a spring 108 attached to the distal end of the link 112 from the fulcrum 109, or other location or type of spring 108.

Embodiments can also include one or more additional gears meshed with the first gear 101 or the second gear 103. For example, a third gear 111 can be mounted on a third annular gear mount 116 which is concentric with the fulcrum 109. As illustrated, the third gear 111 can be mounted at a fixed distance from the second gear 103 and remains meshed at 130 with the second gear 103 during assembly and while the second gear 103 is made to mesh with the first gear 101. Other embodiments can incorporate various arrangements of gears involved in a gear train.

Figure 3:
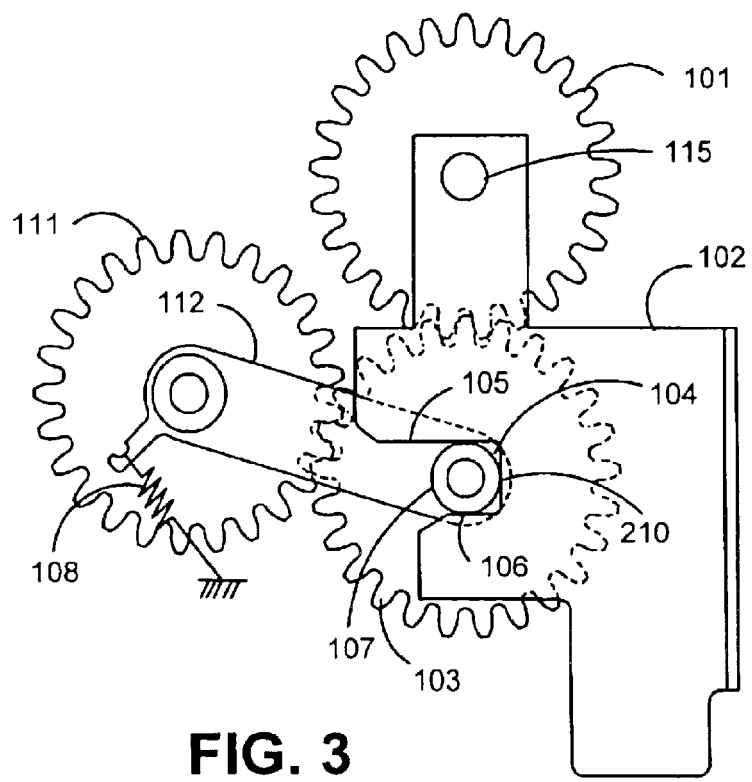
FIG. 3 illustrates the gears of FIG. 2 in a meshed position according to the present invention.

As stated above, during assembly of various assemblies, the first gear 101 can contact the second gear 103 at a contact point 113. Movement, indicated by arrow 120, following the contact at contact point 113, can cause pivotal movement of the link 112. Further movement of the link 112 into the channel 104 can cause a tooth of the second gear 103 to align with a gullet of the first gear 101, wherein the first gear 101 and the second gear 103 can mesh as illustrated in FIG. 3. Meshing can be facilitated by a pivotal force applied to the link 112 which holds the second gear 103 against the first gear 101. According to some embodiments of the present invention, following meshing of the first gear 101 with the second gear 103, the link 112 can continue into the channel 104 until the link 112 contacts an end 210 of channel.

For example, in some embodiments, the first edge 105 and the second edge 106 making up the channel 104 can be essentially parallel to each other at a distance approximately equal to or slightly larger than an outer diameter of the second annular gear mount 107. Alternate embodiments can include edges that are not substantially parallel, such as, for example, edges that form a tapered channel with a wide opening for receiving second annular gear mount 107.

After the first gear 101 meshes with the second gear 103, motion accompanying assembly, indicated by arrow 120, can cause the second annular gear mount 107 to continue into the channel 104 between the first edge 105 and the second edge 106. Positioning of the link 112 with the second annular gear mount 107 in the channel 104 can serve to lock the first gear 101 and the second gear 103 in a meshed position and prevent the first gear 101 and the second gear 103 from coming out of mesh. Some embodiments can include, for example, the outer diameter of the second annular gear mount 107 contacting a rear wall 210 of the channel 104.

Figure 4:
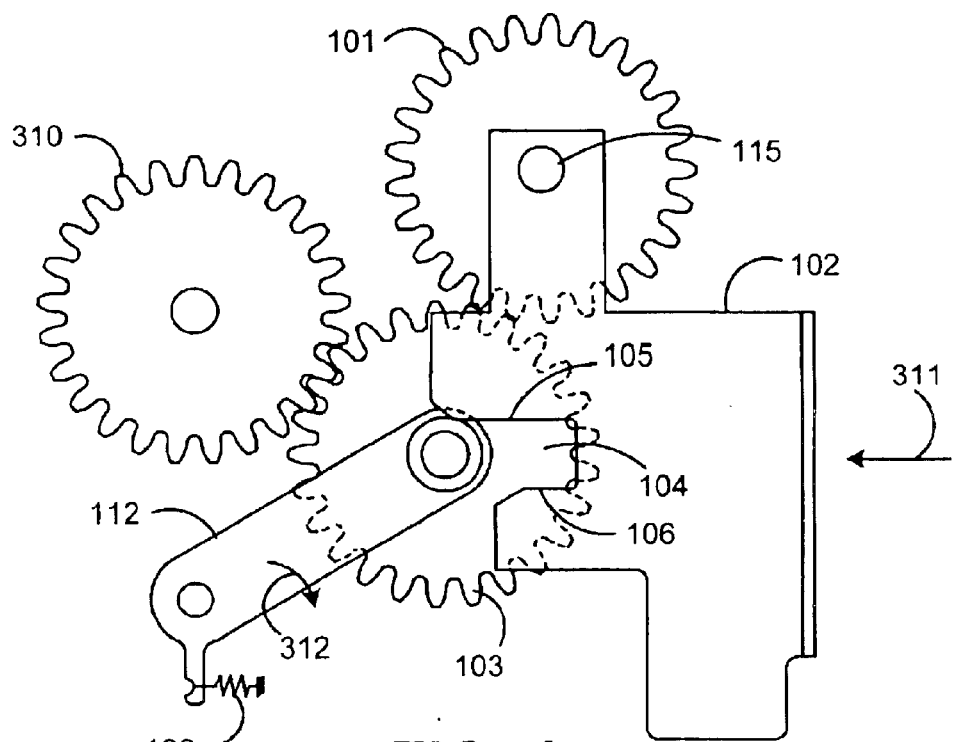
FIG. 4 illustrates a gear mating interface according to another embodiment of the present invention.
Figure 5:
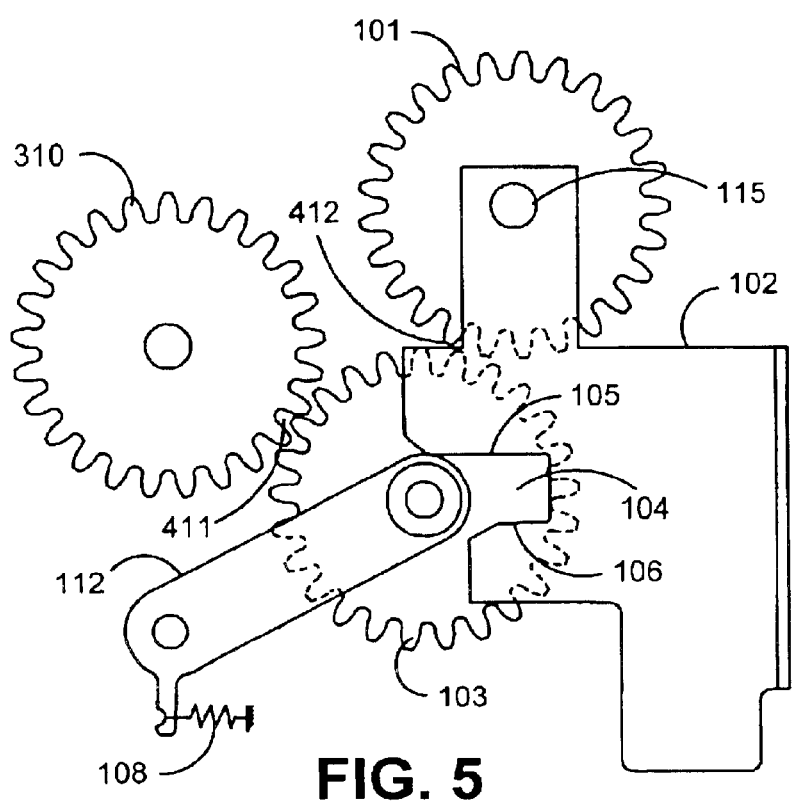
FIG. 5 illustrates the gears of FIG. 4 during a meshing operation according to the present invention.

Referring now to FIGS. 4 and 5, some embodiments can include one or more additional gears, such as a third gear 310, that is not mounted at a fixed distance from the second gear 103. Pivotal movement of the link 112, in the direction indicated by arrow 312, can allow teeth on the second gear 103 to partially disengage from teeth on the third gear 310 until the second gear becomes meshed with the first gear 101. A position that allows the second gear 103 to become meshed with the first gear 101, can also allow the second gear 103 to return to fully meshed engagement with the third gear 310.

For example, during assembly, the gear frame 102 can have the first gear 101 mounted on the first annular gear mount 115. Movement of the gear frame during assembly, indicated by the arrow 311, can cause the apex of teeth on the first gear 101 to contact the apex of one or more teeth on the second gear 103. Further assembly movement 311 can cause the link 112 to pivot away from the first gear 101 and the first edge 105 and also cause the second gear to partially disengage from a meshed position with a third gear 310. Partial disengagement of the second gear 103 from the third gear 310 is illustrated at 411. As the assembly movement proceeds, the apex of the one or more teeth on the first gear 101 move past the apex of the teeth they contacted on the second gear 103, as illustrated at 412. Pivotal force supplied by a spring 108 can cause the second gear 103 to become fully meshed with the first gear 101 and the third gear 310, and also approach the first edge 105. Assembly can be completed with the link 112 secured between the first edge 105 and the second edge 106 of the channel 104 holding the second gear 103 in a position fully meshed with both the first gear 101 and the third gear 310.

Referring now to FIG. 6, the process of mating gears into a meshed position during assembly of a mailing machine according to some embodiments of the present invention can include at 510 bringing the apex on a tooth of a first gear 101 into engagement with an apex of a tooth on a second gear 103. At 511, mating can continue with the second gear 103 being pivoted away from the first gear 101 as the engagement moves the first gear 101 in a direction towards the second gear 103. At 512, continued assembly movement can align the apex of a tooth on either the first gear 101 or the second gear 103 with the gullet on the other gear until, at 513, the second gear 103 can be pivoted towards the first gear 101 causing the first gear 101 to mesh with the second gear 103. At 514, the second gear 103 can be secured in a position fully meshed with the first gear 101.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. For example, the gear train mating described herein can be applied to a mailing machine or other type of equipment that can involve the assembly of disparate parts. In addition, embodiments can include a linear gear, such as a mating of a rack with a pinion of other type of gearing device that includes gearing teeth. Other variations relating to implementation of the functions described herein can also be implemented. Accordingly, other embodiments are within the scope of the following claims.

What is claimed is:

1. A gear mating device for mating a first gear with a second gear, the device comprising:

a gear frame including a first annular gear mount, the first annular gear mount having the first gear mounted thereon, the gear frame further including a channel formed by a first edge and a second edge;

a link pivotally mounted at a first end on a fulcrum, the link having a second end including a second annular gear mount having the second gear mounted thereon; and means for providing a normal force on the link in a direction opposing pivotal movement of the link, wherein, when the first gear and the second gear are brought together for mating, the link pivots to allow the first gear and the second gear to mesh, and the second annular gear mount is guided into the channel in the gear frame to secure the second gear in a meshed position with the first gear.

2. The gear mating device of claim 1, wherein the first edge and the second edge of the gear frame are essentially parallel.

3. The gear mating device according to claim 1, wherein the first edge of the gear frame extends beyond the second edge.

4. The gear mating device of claim 1 wherein the means for providing a normal force comprises:

a spring hook fixedly attached to the link;

a spring attached to the spring hook such that the spring will exert a force on the spring hook opposing pivotal movement of the link.

5. The gear mating device of claim 4 wherein the spring hook is integral with the link.

6. The gear mating device of claim 1 wherein the means for providing a normal force comprises a torsional spring.

7. The gear mating device of claim 1 additionally comprising a third annular gear mount concentric with the fulcrum and a third gear mounted on the third annular gear mount, wherein the third gear is meshed with the second gear throughout mating of the first gear and the second gear.

8. The gear mating device of claim 1 additionally comprising a third gear positioned to mesh with the second gear such that pivotal movement about the fulcrum caused by jamming of the first and second gears during mating of the first gear and the second gear is insufficient to cause the second and third gears to become unmeshed.

9. A mailing machine comprising:

a first module having a gear frame including a first annular gear mount, the first annular gear mount having a first gear mounted thereon, the gear frame further including a channel formed by a first edge and a second edge: and a second module for mating with the first module, the second module having a link pivotally mounted at a first end on a fulcrum, the link having a second end including a second gear mounted thereon, the second gear for mating with the first gear of the first module when the first and second modules are mated, the second module further including means for providing a normal force on the link in a direction opposing pivotal movement of the link, wherein when the first module and the second module are brought together, the link pivots to allow the first gear and the second gear to mesh, and the second annular gear mount is guided into the channel in the gear frame to secure the second gear in a meshed position with the first gear.

10. The mailing machine of claim 9, wherein the first edge and the second edge of the gear frame are essentially parallel.

11. The mailing machine of claim 9, wherein the first edge of the gear frame extends beyond the second edge.

12. The mailing machine of claim 9, wherein the means for providing a normal force comprises:

a spring hook fixedly attached to the link and essentially planar with the supporting portion, the spring hook extending away from the supporting portion;

a spring attached to the spring hook and secured such that the spring will exert a normal force on the spring hook in response to pivotal movement of the link thereby imparting a pivotal force to the link.

13. The mailing machine of claim 12 wherein the spring hook is integral with the link.

14. The mailing machine of claim 9 wherein the means for providing a normal force comprises a torsional spring.

15. The mailing machine of claim 9 further comprising:

a third annular gear mount concentric with the fulcrum and a third gear mounted on the third annular gear mount, wherein the third gear is meshed with the second gear throughout mating of the first and second modules.

16. The mailing machine of claim 9 further comprising:

a third gear positioned to mesh with the second gear such that pivotal movement about the fulcrum caused by jamming of the first and second gears during mating of the first and second modules is insufficient to cause the second and third gears to become unmeshed.

* * * * *